F. A. CIGOL.
APPARATUS FOR FORMING HOLLOW ARTICLES OF RUBBER.
APPLICATION FILED JULY 31, 1920.
1,358,289.  
Patented Nov. 9, 1920.
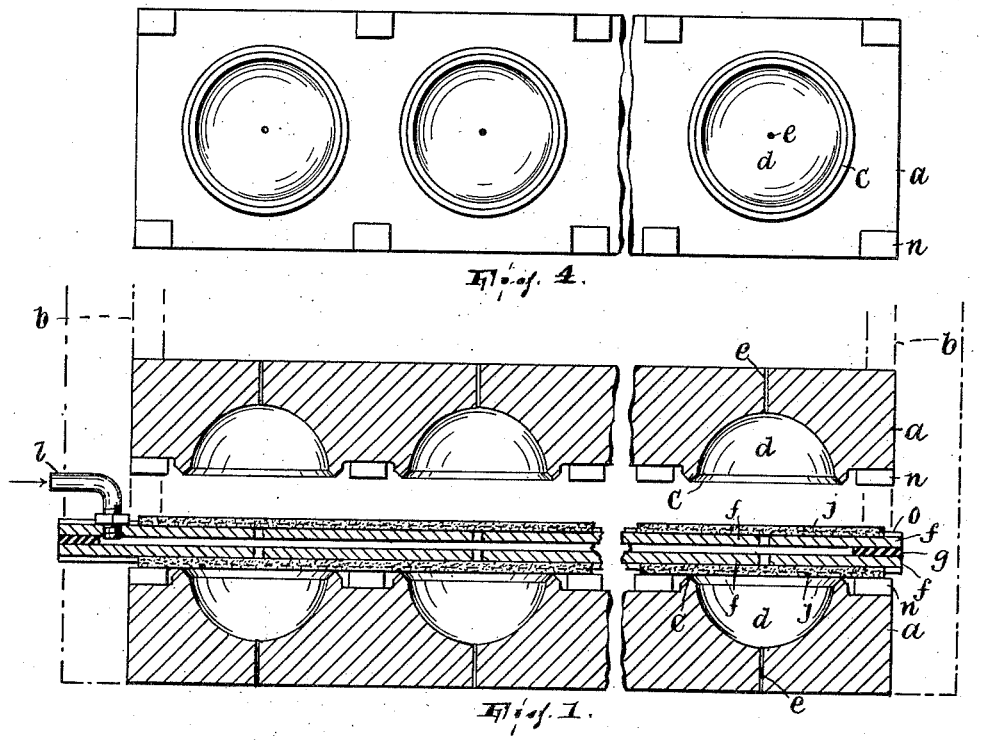
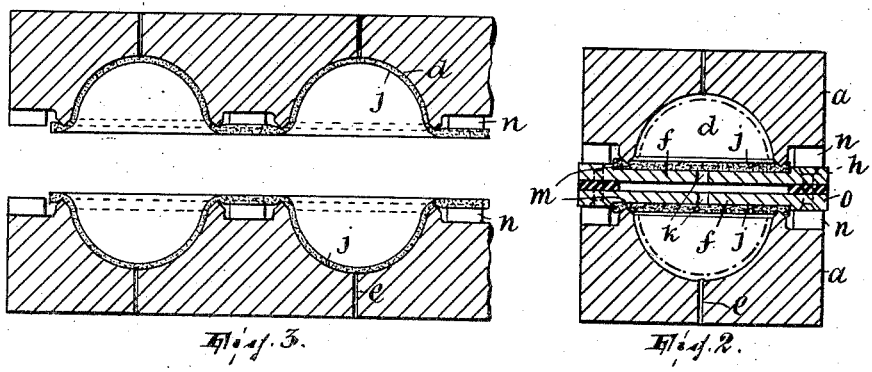
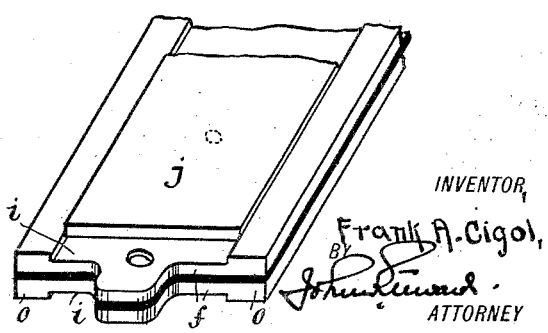
WITNESS:  
Wm D Bell
INVENTOR,  
Frank A. Cigol,  
BY  
John Leonard  
ATTORNEY

UNITED STATES PATENT OFFICE.

FRANK A. CIGOL, OF PATERSON, NEW JERSEY.

APPARATUS FOR FORMING HOLLOW ARTICLES OF RUBBER.

1,358,289.  Specification of Letters Patent.  Patented Nov. 9, 1920.

Application filed July 31, 1920. Serial No. 400,317.

*To all whom it may concern:*

Be it known that I, FRANK A. CIGOL, a citizen of the United States, residing at Paterson, in the county of Passaic and State of New Jersey, have invented certain new and useful Improvements in Apparatus for Forming Hollow Articles of Rubber, of which the following is a specification.

This invention relates to the forming of hollow articles of plastic sheet material, as rubber, and it consists in an apparatus whereby a dished body, as the half of a rubber ball, may first be formed from a flat sheet into concavo-convex shape by fluid pressure and then subjected to some additional operation affecting its edge, as the trimming thereof or it may be the joining thereof with the edge of another such and similarly and simultaneously formed dished body or half, the invention having for its principal object and resulting in considerable simplification both of apparatus and procedure and a more perfect product. Given the members of a press, one of which (at least) has a projecting die formed in a continuous line and adapted to coact with the other member to compress the sheet material continuously of said line on a secondary pressure movement of one of said members toward the other, as in cutting or trimming off its edge, my invention contemplates the employment as parts of the press of means removably arranged between said members and adapted to support said material opposite the die and form with the latter and of said material a continuous seal on a primary pressure movement of one of said members toward the other and also forming a stop to said primary pressure movement before the die contacts with the support so that the primary pressure movement will not cause the die to prematurely cut through the material but only result in the forming of said seal, said means having a fluid admission port leading to the material-supporting surface thereof opposite the die. Said means in the form herein shown is a unitary device consisting of a hollow platen suitably constructed to coact with the die in forming the seal and thereupon to admit fluid under pressure between the surface-portions of itself and said material which are circumscribed by the die, and including the means to stop or limit the primary pressure movement as stated.

I have illustrated and herein describe my invention in connection with a form of the apparatus employed wherein two of the halves are formed at once upon the primary movement of the press and then, after the removal of the platen, these two are edge-joined to each other and trimmed to produce a whole hollow body, to be afterward treated, as by vulcanizing, as the circumstances may require.

In the drawing,

Figure 1 shows the members of the press with the platen and, on both sides thereof, the plastic sheet material interposed between them, all in vertical section, the several parts being ready for the primary movement of one press member toward the other;

Fig. 2 shows the same parts as appear in Fig. 1 but in section in a plane at right angles to that of Fig. 1, the primary pressure movement having taken place and the seal being formed as to each sheet;

Fig. 3 is a vertical sectional view corresponding to Fig. 1, but showing the press members separated, after the primary pressure movement, and the platen removed, the halves having been formed;

Fig. 4 is a working face view of one of the press members; and

Fig. 5 is a perspective view of the platen.

Let $a\ a$ represent the members of a hydraulic press, one of which, as the upper one, is movable in suitable guideways $b$ toward and from the other. They are shown in the present instance both formed with projecting circular dies $c$ each of which embraces a recess $d$ which, if a ball is to be the ultimate product of the press, is hemispherical. There is a fluid passage $e$ leading from the recess to the atmosphere. If, as shown, both members $a\ a$ have the dies $c$, each will have the same number of dies as the other and the dies on one member will be in opposite coincidence with those on the other.

The platen consists of two plates $f\ f$ of about the same area as the press members. They are secured together, with a marginal gasket of rubber or the like intervening between them, by rivets $h$ or otherwise, so that the platen in effect forms a flat chamber. The top and bottom faces $i\ i$ of this platen form surfaces against which the plastic sheet material $j$ rests and with which the dies coact each to form a seal in a continuous line of the material. There are ports $k$ $k$ leading from the inclosed space of the chamber formed by the platen to its said surfaces $i$ $i$, so arranged that when the platen is placed between and in proper registry with the press members the ports $k$ $k$ will be opposite the recesses $d$ of the dies. The platen may also have a nipple $l$ for attaching thereto flexible tubing or the like leading to a source of fluid under pressure, whereby to charge the chamber formed by the platen with such fluid.

The first operation that is to be performed on the plastic sheet material is to alter its shape from planiform to concavo-convex. This is accomplished by placing the said material against the opposite faces of the platen—to which it will usually adhere if it is rubber in the natural state—and then introducing the platen and such material between the members of the press, whereupon one member is moved toward the other so that each die will form between itself and the platen and of the material a continuous seal, as at $m$, Fig. 2; then the pressure is admitted at the nipple $l$, and the pressure in each recess $d$ being allowed to escape by the outlet $e$ the pressure which is admitted to the platen enters via ports $k$ between the material and the platen, bulging the former into the molds formed by the recesses $d$. The material now having assumed the concavo-convex form, the platen is removed. The second operation is one in which the dies $c$ of the two press members are to coact to exert greater pressure than in the seal-forming operation, as in trimming off the part of the material surrounding each die and compressing the margins of each two opposite concavo-convex halves together so as to join them by adhesion, the platen having been removed, as explained, between the primary or seal-forming pressure movement and this, the secondary, pressure movement.

In the primary pressure movement the moving press member should advance far enough to produce an effective seal $m$ but not to cut through the material, for if it did so cut through the material the latter would not have marginal substance left to form a satisfactory joint with the opposite or complementary concavo-convex piece when in the secondary operation the whole or complete hollow article is to be produced. Therefore I provide for stopping the primary pressure movement of the moving press member at the point where the seal is perfectly formed. This means may consist of opposite lugs $n$ on the two working faces of the members $a$ $a$ and thickened portions $o$ $o$ on the platen, the latter being adapted to register with the lugs $n$ when the platen is in proper position between the press members; the lugs $n$ may be the same height as the dies $c$, and the thickened portion $o$ so formed as to produce elevations on the opposite faces of the platen, each elevation being of somewhat less height than that represented by the thickness of the plastic sheet material $j$. The function performed by the medium thus produced for stopping the primary pressure movement of the moving press member is shown in Fig. 2 where the limit of compression has been reached but the seal has been formed at $m$.

It will be understood in view of what has already been said that by checking the movement of one press member toward the other in their primary pressure action and so leaving the stock $j$ uncut along the continuous die-line the material thereof remains present along said line to be compressed with the coinciding material of the other piece of stock when the secondary pressure operation occurs, the platen having been meanwhile removed, and this results in a more perfect and stable seam between the two halves when they have been joined by the secondary operation.

Having thus fully described my invention, what I claim as new and desire to secure by Letters Patent is:—

1. A press for the purpose set forth including, with its coacting pressure members, one having a projecting die formed in a continuous line and adapted to coact with the other to compress plastic sheet material continuously of said line on a secondary pressure movement of one of said members toward the other, means removably arranged between said members and adapted to support said material opposite the die and form with the latter and of said material a continuous seal on a primary pressure movement of one of said members toward the other, and also forming a stop to check said primary pressure movement before the die contacts with said means, said means having a fluid admission port leading to the material-supporting surface thereof opposite the die.

2. A press for the purpose set forth including, with its coacting pressure members, one having a projecting die formed in a continuous line and adapted to coact with the other to compress plastic sheet material continuously of said line on a secondary pressure movement of one of said members toward the other, a platen removably arranged between said members and adapted to support said material opposite the die and form with the latter and of said material a continuous seal on a primary pressure movement of one of said members toward the other, and also forming a stop to said primary pressure movement before the die contacts with said platen, said platen having a fluid admission port leading to the material-supporting surface thereof opposite the die.

In testimony whereof I affix my signature.

FRANK A. CIGOL.